United States Patent
Smith et al.

(10) Patent No.: US 8,785,057 B1
(45) Date of Patent: Jul. 22, 2014

(54) ELECTROLYTE SOLUTION FOR CAPACITORS AND BATTERIES

(71) Applicant: Retriev Technologies Incorporated, Anaheim, CA (US)

(72) Inventors: W. Novis Smith, Philadelphia, PA (US); Joel R. McCloskey, Philadelphia, PA (US); Jonathan Maeyer, Haddonfield, NJ (US)

(73) Assignee: Retriev Technologies Incorporated, Anaheim, CA (US)

( * ) Notice: Subject to any disclaimer, the term of this patent is extended or adjusted under 35 U.S.C. 154(b) by 0 days.

(21) Appl. No.: 14/073,401

(22) Filed: Nov. 6, 2013

(51) Int. Cl.
*H01M 6/16* (2006.01)
(52) U.S. Cl.
USPC .......................................... 429/338; 429/336
(58) Field of Classification Search
CPC . Y02E 60/122; Y02E 60/12; H01M 10/0525; H01M 10/052; H01M 4/525; H01M 4/131; H01M 4/505; H01M 4/485
USPC ................................. 429/336, 338
See application file for complete search history.

(56) References Cited

U.S. PATENT DOCUMENTS

| | | | |
|---|---|---|---|
| 4,892,944 A | 1/1990 | Mori et al. | |
| 5,260,855 A | 11/1993 | Kaschmitter et al. | |
| 6,535,373 B1 | 3/2003 | Smith et al. | |
| 6,743,947 B1 | 6/2004 | Xu et al. | |
| 6,902,683 B1 | 6/2005 | Kaji et al. | |
| 6,980,415 B2 | 12/2005 | Higono et al. | |
| 7,436,651 B2 * | 10/2008 | Takeda et al. | 361/502 |
| 7,656,645 B2 * | 2/2010 | Chiba | 361/502 |
| 7,722,989 B2 * | 5/2010 | Ohzuku et al. | 429/223 |
| 7,924,549 B1 | 4/2011 | Smith et al. | |
| 7,939,200 B2 * | 5/2011 | Ohzuku et al. | 429/223 |
| 8,007,938 B2 * | 8/2011 | Kotato et al. | 429/188 |
| 8,043,745 B2 * | 10/2011 | Kotato et al. | 429/199 |
| 8,435,681 B2 * | 5/2013 | Yamada et al. | 429/334 |
| 2006/0024577 A1 | 2/2006 | Schwake | |
| 2007/0002522 A1 | 1/2007 | Takeda et al. | |
| 2007/0194266 A1 * | 8/2007 | Chiba | 252/62.2 |
| 2007/0224514 A1 * | 9/2007 | Kotato et al. | 429/325 |
| 2011/0300453 A1 * | 12/2011 | Kotato et al. | 429/330 |
| 2012/0244426 A1 * | 9/2012 | Kotato et al. | 429/200 |
| 2013/0095379 A1 * | 4/2013 | Kotato et al. | 429/200 |
| 2013/0196225 A1 * | 8/2013 | Kotato et al. | 429/200 |

* cited by examiner

*Primary Examiner* — Stewart Fraser
(74) *Attorney, Agent, or Firm* — RatnerPrestia

(57) ABSTRACT

The present invention provide novel compounds and electrolyte solutions which can be used in capacitors and lithium batteries and which have a liquidus range of from about −65 to about 171 degrees C.

15 Claims, No Drawings

ELECTROLYTE SOLUTION FOR CAPACITORS AND BATTERIES

FIELD OF THE INVENTION

The present invention relates to novel electrolyte solutions for ultra capacitors and lithium batteries having liquidus ranges of from −65° C. to 171° C. which contain new symmetrical and unsymmetrical organic carbonates.

BACKGROUND OF THE INVENTION

The performance of ultra capacitor and lithium battery electrolytes at low temperature is a continuing problem since the conductivity of the electrolyte will go to zero if it freezes before a desired low temperature performance is achieved. Various blends of organic carbonates have been used along with the addition of ethers and low molecular weight esters to achieve low temperature (−60° C.) freezing points of the mixed solvents containing lithium hexafluorophosphate for low temperature lithium-ion battery performance. The use of mixtures of ethylmethyl carbonate with dimethyl carbonate and small quantities of ethylene carbonate have allowed performance down to −20° C. and even −30° C. in some cases for lithium battery electrolytes. The use of tetrahydrofuran (THF) and methyl formate and methyl acetate and dimethyl ethylene glycol (glyme) or dimethoxy ethane (DME) has allowed some battery electrolytes to achieve −40° C. or even −50° C. performance. The problem is that the performance of these electrolytes at high temperatures such as >70° C. causes high vapor pressures in the batteries with these volatile low boiling solvents. In the case of ultra capacitors based on organic electrolytes the situation is similar except most current ultra capacitor electrolytes are based on the use of acetonitrile (low boiling, with by 82° C.) containing tetraethylammonium tetrafluoroborate.

These ultra capacitor electrolytes have an upper operating voltage limitation of 2.7 V. The use of capacitor electrolyte solvents based on the organic carbonates and containing tetralkylammonium tetrafluoroborates has also been limited because of solubility limitations when using propylene carbonate, or by low temperature performance when using mixtures containing ethylene carbonate.

Propylene carbonate has been used in mixtures with other organic carbonates for capacitor electrolytes but this solvent also limits cell voltage to about 3 V and the solubility of the tetrafluoroborate salt decreases rapidly on cooling and also results in low conductivity of the electrolyte at temperatures below −20° C. The use of ethylene carbonate (mp 35° C.) with cyclic organic carbonate mixtures containing organic quaternary tetrafluoroborate salts for capacitor use gives higher operating cell voltage in ultra capacitors, but these electrolytes freeze before −20° C. is reached. Low temperature cycling performance (non-freezing) is desired (required for the use of ultra capacitor performance in vehicle performance down to −30° C.). In aircraft, the temperature desired is down to −40° C. At the same time these applications desire high temperature performance >70° C. with low vapor pressure. This means that volatile solvents which are used for low temperature performance cause problems at the high end of the desired performance range.

U.S. Pat. No. 6,535,373 to Smith, et al., which is herein incorporated by reference, relates to non-aqueous electrolyte solutions containing quaternary ammonium tetrafluoroborate salts that can be used in the present invention. The solvent used in the patent is a nitrile solvent.

U.S. Pat. No. 7,924,549 to Smith, et al., which is herein incorporated by reference, relates to carbon electrodes for capacitors with a high concentration of tetrafluoroborate salts in a non-aqueous aprotic solvent.

U.S. Pat. No. 6,980,415 to Higono, et al., which is herein incorporated by reference, discloses an electrolyte for capacitors comprising dimethyl carbonate and a spiro tetrafluoroborate salt. The solvent and the tetrafluoroborate salt can be used in the present invention.

U.S. Patent Publication No. 20070194266 to Chiba, et al. which is herein incorporated by reference, discloses an electrolyte solution for electric double layer capacitors comprising quaternary ammonium salts and ethylene and propylene carbonate as an electrolyte.

An electrolyte solution which contained an unsaturated carbonate solvent of less than 8% by weight and a saturated solvent of less than 5% by weight has been reported (U.S. Patent Publication No. 2007/0224514 to Kotato et al.). The reason for the low amounts of these two solvent types is that "if the volume exceeds the upper limit an excessive amount of negative electrode coating may be formed and prevent the migration of lithium ions."

SUMMARY OF THE INVENTION

According to one embodiment of the invention, there are provided novel compounds which are useful as solvents for capacitors and lithium acid battery electrolyte solutions. The compounds consist of novel symmetrical and unsymmetrical or asymmetrical carbonates of the formula:

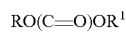

$$RO(C=O)OR^1$$

wherein R is selected from the group consisting of methyl, ethyl, isopropyl, $CH_3OCH_2CH_2-$, $CH_3OCH_2CH_2OCH_2CH_2-$, $CH_3OCH_2CH_2OCH_2CH_2OCH_2CH_2-$, $R''OCH_2CH_2-$ and $R'''-O-(CH_2)_n-$, wherein n is 2, 3 or 4 and $R^1$ is selected from the group consisting of $CH_3OCH_2CH_2-$, $CH_3OCH_2CH_2OCH_2CH_2-$, $CH_3OCH_2CH_2OCH_2CH_2OCH_2CH_2-$, $CH_3CH_2OCH_2CH_2-$ and $R''-O-CH_2CH_2-$, wherein $R''$ is methyl, ethyl, propyl or isopropyl.

According to another embodiment of the invention, the novel carbonates of the invention can be mixed with each other or with other organic cyclic or linear carbonates, ethers and esters in amounts up to 65% by weight of the mixed solvent systems.

One aspect of the invention provides novel organic carbonates.

According to another object of the invention there is provided an electrolyte solution for capacitors and lithium batteries comprising the novel organic carbonates alone or admixture with other suitable solvents for capacitors and lithium batteries.

In another aspect of the invention, capacitors are provided with electrolyte solutions that contain soluble quaternary ammonium tetrafluoroborate salts and that have a wide liquidus range preferably from −70° C. to >150° C.

In yet a still further embodiment of the invention, an ultra capacitor is provided having a stable operating cell voltage of about 4V when containing 2M of a quaternary ammonium tetrafluoroborate salt at room temperature.

One aspect of the invention provides an electrolyte solution for low temperature capacitors or lithium batteries comprising a solvent system which is comprised of 35-100% (alternatively, 50-100%) by weight in total of at least one symmetrical or asymmetrical carbonate of the general formula (I):

$$RO(C=O)OR^1 \qquad (I)$$

wherein R is selected from the group consisting of methyl, ethyl, isopropyl, propyl, $CH_3OCH_2CH_2$—, $CH_3OCH_2CH_2OCH_2CH_2$—, $CH_3OCH_2CH_2OCH_2CH_2OCH_2CH_2$—, R"OCH$_2$CH$_2$— and R"—O—(CH$_2$)$_n$—, wherein n is 2, 3 or 4, $R^1$ is selected from the group consisting of $CH_3OCH_2CH_2$—, $CH_3OCH_2CH_2OCH_2CH_2$—, $CH_3OCH_2CH_2OCH_2CH_2OCH_2CH_2$—, $CH_3CH_2OCH_2CH_2$— and R"—CH$_2$CH$_2$—, and R" is methyl, ethyl, propyl or isopropyl and up to 65% by weight in total of at least one solvent which is different from the symmetrical or asymmetrical carbonate of general formula (I), said electrolyte solution additionally comprising at least one conductive salt such as a lithium salt or a quaternary ammonium compound and having a liquidus range of about −65° C. to about 171° C.

DESCRIPTION OF THE PREFERRED EMBODIMENTS

According to the present invention, one embodiment relates to a novel solvent of symmetrical and unsymmetrical carbonates having the general formula $$RO(C=O)OR^1$$

wherein R is selected from the group consisting of methyl, ethyl, isopropyl and propyl and taken from the group $CH_3OCH_2CH_2$—, $CH_3OCH_2CH_2OCH_2CH_2$—, and $CH_3OCH_2CH_2OCH_2CH_2OCH_2CH_2$—, and R"OCH$_2$CH$_2$— and R"—O—(CH$_2$)$_n$—, wherein n is 2, 3 or 4 and $R^1$ is selected from the group consisting of $CH_3OCH_2CH_2$—, $CH_3OCH_2CH_2OCH_2CH_2$—, $CH_3OCH_2CH_2OCH_2CH_2OCH_2CH_2$—, $CH_3CH_2OCH_2CH_2$— and R"—O—CH$_2$CH$_2$—, and wherein R" is methyl, ethyl, propyl or isopropyl.

According to another embodiment of the invention the carbonate solvents of the invention may be a mixture of themselves in a total amount of 35 to 100% with up to 65% by weight (e.g., 0-65% by weight) of one or more other linear or cyclic carbonates, carboxylic esters and/or ethers. That is, the solvent can comprise 0-50% by weight of cyclic carbonates, for example, 50% by weight EC and 50% by weight of one or more carbonates of the invention, or, in another example, 25% by weight EC, 10% by weight PC and 65% by weight of one or more carbonates of the invention.

Cyclic carbonates include ethylene carbonate (hereafter designated as EC) and propylene carbonate (PC). Linear carbonates include dimethyl carbonate (DMC), diethyl carbonate (DEC), ethylmethyl carbonate (EMC), etc.

The carboxylic ester used herein preferably has three or more carbon atoms and one or more carboxylic ester bonds. The upper limit of the number of carbon atoms in the carboxylic ester is not particularly limited. In view of the compatibility with the chain carbonate and/or cyclic carbonate, the carboxylic ester preferably has ten or less carbon atoms and more preferably eight or less carbon atoms.

The number of carboxylic ester bonds in the carboxylic ester is one or more as described above. Since an increase in the number of carboxylic ester bonds generally leads to an increase in the viscosity of the carboxylic ester, the number of carboxylic ester bonds is preferably one or two.

Examples of suitable carboxylic esters include dimethyl succinate, ethyl methyl succinate, diethyl succinate, dimethyl 2-methylsuccinate, ethyl methyl 2-methylsuccinate, dimethyl glutarate, ethyl methyl glutarate, diethyl glutarate, dimethyl 2-methylglutarate, ethyl methyl 2-methylglutarate, diethyl 2-methylglutarate, dimethyl adipate, ethyl methyl adipate, diethyl adipate, 1,2-diacetoxyethane, 1,2-diacetoxypropane, 1,4-diacetoxybutane, glycerin triacetate, methyl 4-acetoxybutyrate, gamma butyrolactone, methyl 2-acetoxyisobutyrate, ethyl acetate and methyl acetate.

The electrolyte solutions of the present invention for capacitors and lithium batteries comprise the novel solvents of the invention and one or more conductive salts such as a lithium salt or a quaternary ammonium salt dissolved as an electrolyte.

The conductive salt may be any that is capable of being used in electrical storage devices, such as lithium secondary cells, lithium ion secondary cells and electrical double-layer capacitors. Conductive salts that may be used include alkali metal salts and quaternary ammonium salts. Combinations and mixtures of different conductive salts may be utilized.

Preferred alkali metal salts are lithium salts, sodium salts and potassium salts. Specific examples include: (1) lithium salts such as lithium tetrafluoroborate, lithium hexafluorophosphate, lithium perchlorate, lithium trifluoromethanesulfonate, sulfonyl imide lithium salts, sulfonyl methide lithium salts, lithium acetate, lithium trifluoroacetate, lithium benzoate, lithium p-toluenesulfonate, lithium nitrate, lithium bromide, lithium iodide and lithium tetraphenylborate; (2) sodium salts such as sodium perchlorate, sodium iodide, sodium tetrafluoroborate, sodium hexafluorophosphate, sodium trifluoromethanesulfonate and sodium bromide; and (3) potassium salts such as potassium iodide, potassium tetrafluoroborate, potassium hexafluorophosphate and potassium trifluoromethanesulfonate.

Highly conductive quaternary ammonium and related imidazolium salts and triflates and mixtures thereof as tetrafluoroborates have synergistic effect on their solubilities and conductivities at low temperatures when dissolved in the solvents of the invention.

Specific examples of the quaternary ammonium salts suitable for use in the present invention include, but are not limited to, triethylmethylammonium tetrafluoroborate, diethyldimethylammonium tetrafluoroborate, ethyltrimethylammonium tetrafluoroborate, dimethylpyrrolidinium tetrafluoroborate, diethylpyrrolidinium tetrafluoroborate, ethylmethylpyrrolidinium tetrafluoroborate, spiro-(1,1$^1$)-bipyrrolidinium tetrafluoroborate, dimethylpiperidinium tetrafluoroborate, diethyl piperidinium tetrafluoroborate, spiro-(1,1$^1$)-bipiperidinium tetrafluoroborate, piperidine-1-spiro-1$^1$-pyrrolidinium tetrafluoroborate, or the triflates thereof.

Of these, triethylmethylammonium tetrafluoroborate, spiro-(1,1$^1$)-bipyrrolidinium tetrafluoroborate, diethyl pyrrolidinium tetrafluoroborate, dimethylpyrrolidinium tetrafluoroborate, and the like are particularly preferable.

The concentration of the conductive salt in the electrolyte solution of the present invention is preferably from 1 to 3 mol/l, particularly preferably from 1 M to 2 M of the electrolyte solution.

If the concentration of the conductive salt is less than 0.5 mol/l, the conductivity may be insufficient; if more than 3 mol/l, the low temperature performance and economical efficiency may be impaired.

What is needed are solvents with high operating voltages greater than 3 V for the ultra capacitor in which conductive salts such as quaternary tetrafluoroborate salts are very soluble and which have a wide liquidus range preferably from −70° C. to >150° C. In addition, the solvent should remain liquid with high salt concentrations of salt from >1 M up to 2

M. The same is also true for lithium ion battery electrolytes. The organic carbonates of the invention meet all of these requirements. The preferred solvent is methyl methoxyethyl carbonate ($CH_3O(C=O)OCH_2CH_2OCH_3$), (MMC). The liquidus range of this solvent is about −65° C. to about 171° C. providing the outstanding low temperature and high temperature performance while dissolving a high level of conductive salt. This solvent has a stable operating cell voltage of about 4 V in ultra capacitor performance when containing 2 M diethyldimethyl ammonium tetrafluoroborate at room temperature. Other quaternary alkylammonium tetrafluoroborates can also be used for this same stable high operating voltage in this solvent and related solvents. This same stable solvent with 2 M quaternary ammonium tetrafluoroborate salt will reversibly charge/discharge cycle at −45° C. in an ultra capacitor.

Preparation of Novel Carbonate Solvents

A direct synthesis for the symmetrical and asymmetrical members of the family of organic carbonates is the following equilibration:

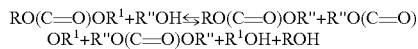

(in the presence of basic catalyst such as sodium methoxide) In the case of dimethyl carbonate and 2-methoxy ethanol this becomes:

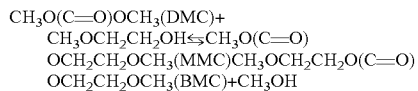

After equilibration, the catalyst can be neutralized with an acid or acid salt and the reaction mixture distilled to remove the alcohols and obtain pure organic carbonate components or a useful mixture of organic carbonates. Using an excess of the DMC in this case favors more of the desired MMC (asymmetrical component) as opposed to the symmetrical component bis-2-methoxyethyl carbonate (BMC). Mixtures of both with the starting material can be used as long as the alcohols are removed. The MMC is a preferred solvent of these series of novel organic carbonates and is new and novel.

The practice of the present invention will employ, unless otherwise indicated, conventional techniques of synthetic chemistry, electrochemistry and battery/capacitor engineering that are within the skill of the art. Such techniques are explained fully in the literature. See, for example, March's Advanced Organic Chemistry, House's Modern Synthetic Chemistry, Houben-Weyl's Methoden der organischen Chemie, Hier's text Organic Synthesis, U.S. Pat. No. 4,892,944 to Mori et al., and Lindens' Handbook of Batteries.

It is to be understood that this invention is not limited to the particular cations or salts, methods of synthesis, solvents or the like, which are described in the preferred embodiments, as such may vary. It is also to be understood that the terminology used herein is for the purpose of describing particular embodiments only, and is not intended to be limiting.

EXAMPLE 1

Preparation of methyl-(2-methoxyethyl)-carbonate (MMC)

In a 2 L 3-necked flask, 1749 g (19.41 moles) of dimethyl carbonate (DMC), 246.14 g (3.24 moles) of 2-methoxy ethanol, and 49.23 g (5 wt. %) of a 25% sodium methoxide in methanol solution were added. A 250° C. thermometer was added to the flask and the reaction flask was then fitted to a distillation apparatus containing a thermometer and a collection flask. This was stirred at room temperature for 30 minutes until a cloudy, white suspension began to form. This mixture was then heated slowly to a reaction flask temperature of 70° C. At this point, the first drop of distillate was collected at 43° C. The distillate was continuously collected and checked by gas chromatograph for the presence of products methyl-(2-methoxyethyl) carbonate (MMC) and bis-2-methoxy ethyl carbonate (BMC). This was continued until the reaction flask reached a temperature of 100° C. and the distillation temperature reached 72° C. At this point, the reaction flask contents contained only a small percentage of DMC and no methanol. The reaction mixture was allowed to cool to room temperature. The reaction mixture was treated with $NaH_2PO_4$, mixed, and filtered. This step was then repeated with the filtrate to assure that no catalyst remained. The filtrate was then transferred to a 500 mL 3-necked flask and stirred. This was then vacuum-distilled slowly. The first fraction started at a distillation temperature of 28° C. and a reaction flask temperature of 35° C. These fractions were mostly DMC. The MMC fractions were collected at a distillation temperature of 43° C. under vacuum of 24 mm Hg and a reaction flask temperature of 55° C. The gas chromatograph showed at 91% yield of MMC of essentially 100% purity in the fraction of MMC product collected. The remainder of the mix was composed of 6% MMC and 9% BMC.

EXAMPLE 2

Preparation of Electrolyte Solutions

A. An electrolyte, diethyl dimethyl ammonium tetrafluoroborate, was dissolved in the mixed solvents of Example 1 to have a concentration of 2 M.

B. An electrolyte, trimethyl ethyl ammonium tetrafluoroborate, was dissolved in a mixed solvent EC:DMC 50:50 to prepare an electrolyte solution having a concentration of 2 M.

Alternatively, the solvent can comprise 100% MMC or 5% BMC, 45% MMC, 25% EC and 25% PC (all percentages are % by weight).

The electrolyte solution of part B coagulated before −40° C. The electrolyte solution of part A exhibited low temperature characteristics without coagulating and good conductivity in a wide temperature range down to −60° C. The electrolyte of part A can be used in capacitors used in a wide range of industries from miniature electronic instruments to large automobiles.

C. An electrolyte was made by dissolving lithium tetrafluoroborate in MMC to 1 M.

This electrolyte was used in a lithium ion battery cell and would undergo charge/discharge cycle at −30° C.

What is claimed is:

1. An electrolyte solution for low temperature capacitors or lithium batteries comprising a solvent system which is comprised of 35-100% by weight in total of at least one symmetrical or asymmetrical carbonate of the general formula (I):

wherein R is selected from the group consisting of methyl, ethyl, isopropyl, propyl, $CH_3OCH_2CH_2—$, $CH_3OCH_2CH_2OCH_2CH_2—$, $CH_3OCH_2CH_2OCH_2CH_2OCH_2CH_2—$, $R"OCH_2CH_2—$ and $R"—O—(CH_2)_n—$, n is 2, 3 or 4, $R^1$ is selected from the group consisting of $CH_3OCH_2CH_2—$, $CH_3OCH_2CH_2OCH_2CH_2—$, $CH_3OCH_2CH_2OCH_2CH_2OCH_2CH_2—$, $CH_3CH_2OCH_2CH_2—$ and $R"—O—CH_2CH_2—$, and R" is methyl, ethyl, propyl or isopropyl, and up to 65% by weight in total of at least one solvent which is different from the symmetrical or asymmetrical carbonate of general formula (I), said electrolyte solution additionally comprising at least one conductive salt and having a liquidus range of about −65° C. to about 171° C.

2. The electrolyte solution of claim 1, wherein the at least one conductive salt includes at least one quaternary ammonium compound.

3. The electrolyte solution of claim 2 wherein the at least one quaternary ammonium compound is selected from the group consisting of tetraethyl ammonium tetrafluoroborate, triethylmethylammonium tetrafluoroborate, diethyldimethylammonium tetrafluoroborate, ethyltrimethylammonium tetrafluoroborate, dimethylpyrrolidinium tetrafluoroborate, diethylpyrrolidinium tetrafluoroborate, ethylmethylpyrrolidinium tetrafluoroborate, spiro-(1,1$^1$)-bipiperidium tetrafluoroborate, and combinations thereof.

4. The electrolyte solution of claim 2 wherein the at least one quaternary ammonium compound is present in the electrolyte solution in a concentration of 0.6 to 3 M.

5. The electrolyte solution of claim 1 wherein the solvent system is comprised of 100% of carbonate of formula I.

6. The electrolyte solution of claim 1 wherein the solvent system comprises at least one of methyl-(2-methoxyethyl)-carbonate or bis-2-methoxyethyl carbonate.

7. The electrolyte solution of claim 1 wherein the at least one solvent which is different from the symmetrical or asymmetrical carbonate of general formula (I) is selected from the group consisting of linear carbonates, cyclic carbonates, carboxylic esters, ethers and combinations thereof.

8. The electrolyte solution of claim 1 wherein the at least one solvent which is different from the symmetrical or asymmetrical carbonate of general formula (I) is selected from the group consisting of cyclic carbonates and combinations thereof.

9. The electrolyte solution of claim 1 wherein the at least one conductive salt is a quaternary ammonium tetrafluoroborate.

10. The electrolyte solution of claim 1 wherein the at least one conductive salt includes a lithium salt.

11. A capacitor having an electrolyte solution, wherein the electrolyte solution is an electrolyte solution in accordance with claim 1.

12. A capacitor having an electrolyte solution, wherein the electrolyte solution is an electrolyte solution in accordance with claim 6.

13. The capacitor of claim 11, wherein the capacitor is an ultra capacitor or a double layer capacitor.

14. A lithium battery having an electrolyte solution, wherein the electrolyte solution is an electrolyte solution in accordance with claim 1.

15. A lithium battery having an electrolyte solution, wherein the electrolyte solution is an electrolyte solution in accordance with claim 6.

* * * * *